Patented Nov. 13, 1951

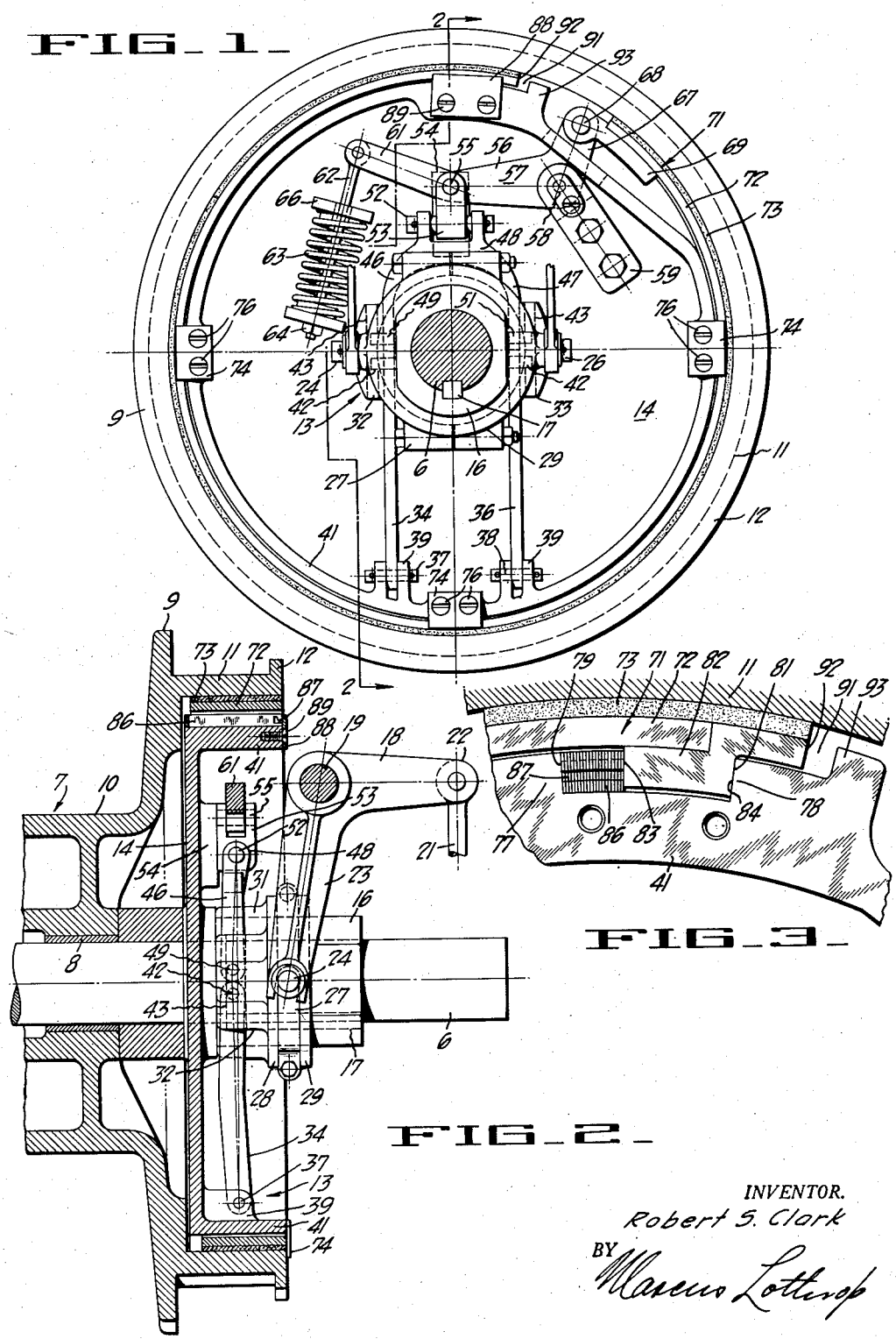

2,574,622

UNITED STATES PATENT OFFICE 2,574,622

CLUTCH WEAR COMPENSATOR

Robert S. Clark, Berkeley, Calif., assignor to Yuba Manufacturing Company, San Francisco, Calif., a corporation of California Application September 17, 1946, Serial No. 697,472

2 Claims. (Cl. 192—111)

My invention relates to clutching devices for coupling and uncoupling a pair of members arranged to rotate with respect to each other or in unison and is particularly applicable to clutches and brakes for use in relatively large winches utilized on heavy machinery such as alluvial dredges. Structure of this kind is subject to hard and heavy loads. It is often utilized in remote parts of the world where extremely long trouble-free operation is necessary and where the type of labor available for adjustment, repair and maintenance is not always skilled.

The invention also is concerned with a clutch in which the actuating mechanism is of the toggle type. This necessitates a rather close adjustment of the structure in order that the toggle mechanism will pass dead center position in the precise manner desired for appropriate clutching action.

In devices of this kind heretofore constructed, there has usually been provided some sort of a screw adjustment which because of the nature of the installation is somewhat inaccessible and is therefore not attended to with as much regularity and precision as desired. Furthermore the adjustment has normally been placed on the actuating side of the clutch and a variation in the adjustment causes a change in the function of the actuator in addition to changing the function of the clutch.

It is therefore an object of my invention to provide a readily accessible means easily operated by relatively unskilled labor to produce a correct and long lasting adjustment of a clutch mechanism.

Another object of the invention is to provide a clutch having a mechanism effective to adjust the clutch without substantially or deleteriously affecting the actuating structure.

A further object of the invention is to provide means for ensuring an adjustment which is not readily dislodged accidentally or disturbed due to vibration and operation of the machinery.

An additional object of the invention is to provide an adjustment especially suited for use with a toggle-type clutch mechanism so that the toggle structure can be set for appropriate action over dead center position for long periods of time.

In accordance with my invention, the preferred form of clutch includes a drum with which is associated an anchor plate. Acting on the drum is a friction shoe having an actuating device operating upon one end therof and having an adjustment at the other end thereof, the adjustment including a lug on the friction shoe receivable and occupying part of the space between a pair of abutments on the anchor plate. The remaining space between the lug and either or both of the abutments is occupied by a packet of shims, individual ones of which are readily movable from one side of the lug to the other to alter the lug position. The shims are held in any selected installed position by a retainer on the anchor plate.

While the clutch of my invention can be embodied in a number of different forms and can take the form of a brake as well as a clutch, depending only upon the mounting of one of the members, it is successfully embodied in connection with a dredge winch as shown in the accompanying drawing, in which Figure 1 is a side elevation of a clutch constructed in accordance with my invention, part of the structure being in section on a transverse plane.

Figure 2 is a cross section, the various planes of which are indicated by the lines 2—2 of Figure 1.

Figure 3 is a side elevation to an enlarged scale of a portion of the clutch structure.

As disclosed in the drawing, the clutch of my invention is utilized in connection with a dredge winch which usually includes a driving shaft 6 supported by any suitable means, not shown, and extending through a winch spool 7 designed to rotate with or on the shaft and supported with respect thereto on bushings 8. The spool 7 is extended to provide a radial flange 9 separating the wire rope receiving portion 10 of the winch from a clutch drum 11 integral with the spool. The clutch drum is a cylindrical spool extension having a terminal flange 12 and is designed to act as a partial housing for a clutch mechanism generally designated 13. The clutch mechanism is effective when actuated to couple the driving shaft 6 to the spool 7 for motion in unison or when disengaged to uncouple the driving shaft 6 from the winch spool 7 so that relative rotation therebetween can take place.

Included in the clutch mechanism is an anchor plate 14 having a central flattened hub 16 encompassing the shaft 6 and designed to engage an axial key 17 securing the anchor plate 14 and the shaft 6 together.

In order to actuate the clutch, there is provided an actuating mechanism including a bell crank 18 mounted on a fulcrum pin 19 suitably disposed on a stationary support, not shown. An actuating rod 21 engages an eye 22 at one end of the bell crank while the other end of the crank affords a bifurcated arm or yoke 23 straddling the shaft 6. The bifurcated ends of the bell crank 18 are notched to engage a pair of radially extending pins 24 and 26 projecting from a shifting ring 27 made in two portions to run between a pair of peripheral flanges 28 and 29 projecting from a sliding collar 31 rotatable with and movable axially of the hub 16. Thus, as the rod 21 is actuated the collar 31 is moved axially toward and away from the anchor plate 14.

The collar 31 at either side is formed with a pair of tangential pockets 32 and 33 into which project a pair of links 34 and 36. At their lower ends the links are secured by pins 37 and 38 between lugs 39 projecting from a peripheral flange 41. The flange 41 is preferably integral with the anchor plate 14 and is disposed concentrically within the flange 11. The upper ends of the links 34 and 36 carry pins 42 extending to engage one side at least of a groove 43 in the sliding collar 31, the other side of the groove, in some positions of the structure, being engaged by the links 34 and 36 themselves.

The upper ends of the links 34 and 36 are rounded to engage the similarly rounded ends of the arms 46 and 47 of a fork 48 straddling the shifting collar and having pins 49 and 51 engaging the groove 43. The fork 48 at its upper end carries a through pin 52 which pierces a block 53 resting against a boss 54 upstanding from the anchor plate 14 and serving slidably to guide the block 53. When the slidable collar 31 is moved, the links 34 and 36 acting in conjunction with the fork 48 serve as a toggle to move the block 53 radially. When the sliding collar 31 is moved toward the right, Figure 2, the toggle is moved to one side of its dead center position and the block 53 is moved radially inward. As the sliding collar 31 is moved toward the left, Figure 2, the toggle is straightened more and more and the block 53 is translated radially outward until such time as the toggle passes dead center. Then the block 53 moves slightly inward but the toggle just barely passes dead center before it is stopped by abutment of the collar 31 with an enlargement of the hub 16 of the anchor plate.

Motion of the block 53 is utilized to actuate the clutch. Piercing the block 53 in an axial direction is a pin 55 held in one arm 56 of an actuating lever 57. This lever is pivoted on a fulcrum pin 58 for swinging movement in clip 59 secured to the anchor plate 14. An extension 61 of the arm 56 is secured by an eyed rod 62 to a helical spring 63 by means of an adjusting nut 64. The spring is mounted on the anchor plate 14 by a projecting ledge 66 so that upon clockwise motion of the lever arm 56, as seen in Figure 1, the spring 63 is compressed. Another arm 67 of the lever 56 is connected by an axial pin 68 to a fitting 69 at one end of a flexible friction shoe 71. This friction shoe is comprised of two portions, an inner flexible band 72 and an outer flexible friction lining 73 designed to engage the flange 11 of the drum 7. As one end of the friction shoe 71 is moved by the actuating linkage circumferentially of the drum, the shoe is flexed or deformed into engagement with the drum or away from engagement with the drum. Undue flexing motion which might tend to dislodge the friction shoe axially is precluded by guides 74 secured at appropriate peripheral portions of the anchor plate 14 by removable fastenings 76.

In order to retain the other end of the flexible friction shoe so that the actuating mechanism will be appropriately effective and in order to provide a suitable mounting and adjustment, the anchor plate 14 is formed, especially as shown in Figure 3, to provide a pair of axially extending, circumferentially spaced lugs 77 and 78 defined in part by radially extending faces 79 and 81. Designed to occupy a portion only of the space between these abutments, is an axially extending radial lug 82 formed at the other end of the friction shoe 71 and having approximately radial faces 83 and 84 designed in certain positions of the structure to abut the corresponding faces 79 and 81.

To occupy the remaining part of the space between the abutments 77 and 78, there is provided a plurality of substantially identical shims collectively designated 86. Each of these shims is a relatively thin plate, usually of metal, having a reentrant notch 87 formed in one end thereof as shown in Figure 2, and designed as a whole to occupy the otherwise empty space near the lug and to wedge the lug 82 between the abutments 77 and 78. As shown in Figure 3, in the initial condition of the structure, all of the shims 86 are disposed between the faces 79 and 83 and are held in position by a retainer 88 (Figure 1) which is removably secured on the anchor plate by fastenings 89. In one extreme adjustment of the structure, the toggle levers 34 and 36 together with the fork 48 just pass dead center position when the lining 73 is in tight or locked engagement with the drum 11 so that the winch spool 7 is tightly locked to the revolving driving shaft 6. As the parts wear, due to prolonged operation, the lining 73 does not engage the interior of the drum 11 with sufficient tightness.

In accordance with the invention, when sufficient wear has occurred, the retainer 88 is removed by removal of the readily accessible screws 89. The friction shoe is relaxed and upon engagement of a suitable tool with the notch 87, one or more of the shims 86 is removed from between the faces 79 and 83. Thereupon a pinch bar or pry bar is inserted in a space 91 between the end face 92 of the friction shoe and an upstanding projection 93 on the anchor plate. The pinch bar is operated to displace the friction shoe circumferentially with respect to the anchor plate in order to take up the space remaining after the removal of one or two or more of the shims 86. As soon as this relative rotation of the friction shoe has occurred, there remains a corresponding space between the faces 81 and 84, that is, between the other projection 78 and the lug 82. The previously extracted shims are thereupon introduced into this resulting space, by force if necessary, so that again the lug 82 is anchored against circumferential motion with respect to the anchor plate.

The anchored end of the friction shoe having been moved toward the actuated end, an adjustment has been effectuated to take up the previous wear to such a point that the clutch is in full engagement when the toggle levers and the fork lever just pass dead center. When this adjustment has been satisfactorily accomplished, the retainer plate 88 is reinstalled and held in position by the fastenings 89. This operation is a simple one, is readily effectuated by unskilled labor and restores the parts to a protected condition wherein they are unaffected by vibration and protracted usage of the structure.

As wear continues, more and more of the shims 86 are transferred from the left-hand side of the lug 82 to the right-hand side thereof as seen in Figure 3, until all of the shims have been so transferred. Following this it is necessary to reline the friction shoe or to replace it with a newly lined friction shoe whereupon the packet of shims is transferred as a body from the right-hand side of the lug 82 to the left-hand side thereof, that is back into the position illustrated in Figure 3. Again the structure is susceptible to adjustment from time to time to take up wear.

I claim:

1. A clutch comprising a drum, an anchor plate adjacent said drum, a friction shoe mounted on said anchor plate and engageable with said drum, means on said anchor plate for moving said shoe into and out of engagement with said drum, a pair of axially extending abutments circumferentially spaced on said anchor plate to constitute the walls of an axially open channel, a radial lug on and extending axially of said shoe and depending between said abutments and movable between them to leave one or two voids circumferentially between said lug and the walls of said channel, and elongated shims adapted to be axially disposed in said channel between said lug and either of said abutments for occupying all of said one or two voids to block said lug against circumferential movement between said abutments.

2. A clutch comprising a drum, an anchor plate adjacent said drum, a friction shoe engageable with and disengageable from said drum, and means for mounting said shoe upon said anchor plate including a pair of circumferentially spaced, axially extending abutments on said anchor plate, said abutments constituting the walls of an axially open channel, an axially extending lug on said brake shoe depending into said channel and adapted to occupy part of the space between said abutments, a plurality of axially extending elongated shims axially insertable into said channel in various circumferential positions between said lug and said abutments and occupying the remaining part of the space in said channel therebetween, and a retainer on said anchor plate overlying said axially open channel and said lug and said shims therein.

ROBERT S. CLARK.

REFERENCES CITED

The following references are of record in the file of this patent:

UNITED STATES PATENTS

| Number | Name | Date |
|---|---|---|
| 833,537 | Medart | Oct. 16, 1906 |
| 1,235,561 | Fording | Aug. 7, 1917 |
| 1,313,317 | Michand | Aug. 19, 1919 |
| 1,327,068 | Stephens | Jan. 6, 1920 |
| 1,398,564 | Mordqvise | Nov. 29, 1921 |
| 1,511,776 | Roberts | Oct. 14, 1924 |
| 1,762,624 | Higgins | June 10, 1930 |
| 2,006,479 | Ragsdale | July 2, 1935 |
| 2,245,740 | White | June 17, 1941 |
| 2,352,969 | Parsons | July 4, 1944 |
| 2,392,188 | Ranch | Jan. 1, 1946 |